United States Patent
Bendzick et al.

(10) Patent No.: US 11,799,201 B2
(45) Date of Patent: Oct. 24, 2023

(54) AUTOMATIC CONSTELLATION-SELECTING SELF-POINTING SATELLITE ANTENNA

(71) Applicant: Electronic Controlled Systems, Inc., Bloomington, MN (US)

(72) Inventors: Michael Bendzick, Falcon Heights, MN (US); Craig Miller, Eden Prairie, MN (US)

(73) Assignee: Electronic Controlled Systems, Inc., Bloomington, MN (US)

( * ) Notice: Subject to any disclaimer, the term of this patent is extended or adjusted under 35 U.S.C. 154(b) by 717 days.

(21) Appl. No.: 16/705,187

(22) Filed: Dec. 5, 2019

(65) Prior Publication Data

US 2020/0185828 A1   Jun. 11, 2020

Related U.S. Application Data

(60) Provisional application No. 62/775,894, filed on Dec. 5, 2018.

(51) Int. Cl.
| | | |
|---|---|---|
| *H04N 21/61* | (2011.01) | |
| *H04N 21/426* | (2011.01) | |
| *H04N 21/2665* | (2011.01) | |
| *H01Q 3/08* | (2006.01) | |
| *H01Q 3/00* | (2006.01) | |
| *H01Q 1/12* | (2006.01) | |
| *H04N 7/20* | (2006.01) | |

(52) U.S. Cl.
CPC ............. *H01Q 3/08* (2013.01); *H01Q 1/1257* (2013.01); *H01Q 3/005* (2013.01); *H04N 7/20* (2013.01); *H04N 21/2665* (2013.01); *H04N 21/426* (2013.01); *H04N 21/6143* (2013.01)

(58) Field of Classification Search
CPC ........... H04N 21/6143; H04N 21/6193; H04N 21/426; H04N 7/20
See application file for complete search history.

(56) References Cited

U.S. PATENT DOCUMENTS

| | | | |
|---|---|---|---|
| 6,864,846 B2 | 3/2005 | King | |
| 7,570,222 B2 | 8/2009 | King | |
| 7,685,621 B2 * | 3/2010 | Matsuo | H04N 21/4622 725/38 |
| 7,716,706 B2 * | 5/2010 | Takagi | H01Q 1/1257 455/226.1 |

(Continued)

*Primary Examiner* — Pinkal R Chokshi
(74) *Attorney, Agent, or Firm* — Skaar Ulbrich Macari, P.A.

(57) ABSTRACT

A satellite television antenna system can include a self-pointing satellite antenna and a power inserter coupled to the self-pointing satellite antenna. The power inserter can include an enclosure body and a circuit board disposed inside of the enclosure body. The circuit board includes a microprocessor. The microprocessor can be configured via software code to determine whether a first type of communication protocol is being received from a set top box (STB) coupled to the power inserter, determine a configuration for a first constellation of spacecraft if the first type of communication protocol is being received from the STB, and determine a configuration for a second constellation of spacecraft if the first type of communication protocol is not being received from the STB. The first constellation of spacecraft is different than the second constellation of spacecraft.

20 Claims, 4 Drawing Sheets

(56) References Cited

U.S. PATENT DOCUMENTS

| | | |
|---|---|---|
| 8,816,923 B2 | 8/2014 | King et al. |
| 10,320,074 B2 | 6/2019 | Roy et al. |
| 10,720,692 B2 | 7/2020 | Miller et al. |
| 2002/0007489 A1* | 1/2002 | Jeong .................. H04H 40/90 348/E7.093 |
| 2005/0289610 A1* | 12/2005 | Takagi ............... H04N 21/4263 348/570 |
| 2008/0276288 A1* | 11/2008 | Kim .................. H04N 21/4263 348/E5.097 |
| 2010/0085256 A1* | 4/2010 | Norin ..................... H01Q 3/08 342/359 |
| 2013/0127665 A1* | 5/2013 | Miller ..................... H01Q 1/42 342/359 |
| 2014/0191909 A1* | 7/2014 | Tinaphong ........... H01Q 1/2275 343/702 |
| 2014/0259080 A1 | 9/2014 | King |
| 2017/0237161 A1* | 8/2017 | Roy ..................... H01Q 19/19 343/757 |

* cited by examiner

AUTOMATIC CONSTELLATION-SELECTING SELF-POINTING SATELLITE ANTENNA

PRIORITY

This application claims the priority benefit of U.S. Provisional Application No. 62/775,894, filed on Dec. 5, 2018, which is hereby incorporated herein by reference in its entirety.

FIELD

The present invention relates generally to satellite television antenna systems and, more particularly, to satellite television antenna systems that can automatically determine a constellation of spacecraft needed for viewing satellite television.

BACKGROUND

The growth in the number of available media channels and improved reception due to digital broadcasts has driven consumers to look beyond normal television antennas and cable systems. Digital signals broadcast from satellites are capable of providing hundreds of video, audio and data channels to users without the constraint of land line connections. For example, television and other programming is distributed by a constellation of satellites (spacecraft) parked in geostationary orbits at 22,300 miles above the earth. These and other broadcasts from spacecraft located in orbits around the earth allow users to receive the broadcasts in many areas; such as mountainous regions, at sea or desolate areas, where earth-based transmitters or cable infrastructure traditionally are unable to reach.

A satellite can only broadcast a finite amount of data simultaneously. Therefore, it is sometimes or often necessary for satellite programming providers, for example DISH Network and DirecTV, to spread their programming across more than one satellite located at different positions or orbital slots in the sky. Thus, for a customer to receive their full compliment of programming, their satellite antenna equipment may need to aim and lock on to a constellation of one, two, three or more spacecraft that are each in different orbital positions (e.g. 110 degrees W, 119 degrees W, etc.) depending on the user's specific programming package and the particular channel the user has chosen via their set top box. With the adoption of high definition (HD) programming, which consumes more bandwidth per channel versus standard definition, the proliferation of orbital positions for the spacecraft has become commonplace.

Satellite antenna products designed for mobile environments (such as recreational vehicles (RVs) and tailgating/camping) often need to be able to work with more than one constellation of spacecraft. For example, a user that switches from service with DISH Network to DirecTV will either need to reconfigure their antenna device or will need to purchase new equipment that is appropriately configured.

In another example, vehicle manufacturers (of recreational vehicles, ice fishing houses, etc.), distributors and retailers desire to offer a satellite TV antenna on their vehicle for customers but do not know which of multiple satellite TV service providers the customer will desire to use. Therefore, reconfigurable antenna systems are preferred.

Thus, there is a desire to provide satellite antenna systems that are capable of locating different constellations in order to work with more than one provider or to accommodate a geographic relocation. But providing a satellite antenna system that can be reconfigured is made difficult by the fact that the various satellite TV service providers do not collaborate between themselves on standards. Thus, there is no standardized protocol to inform an antenna of the desired constellation of spacecraft for that service provider and the user's particular service package.

The state of the industry requires economical hardware that does not readily lend itself to the added expense of electronic display-type user interfaces that might be provided to the antennas. Thus, text prompts or graphical user interfaces that clearly prompt for setup are not provided. Instead, the user is provided with only a small number of buttons and lights to select the service provider and constellation, which can be frustrating to use by many persons. Instead, users prefer simplicity in using their devices. In other words, users would prefer an antenna device that "just works" automatically with whatever television programming packages and service providers that the user happens to have at that moment.

All current implementations of means for selecting spacecraft constellations require manual selection or setup by the user. Each of these suffer from certain drawbacks. Common to all such manual selection means is the fact that users often do not know the identity of their own service provider and/or constellation. Thus, manual selection proves to be frustrating to many users.

The provision of one or more manual switches that must be moved to certain positions to indicate the desired provider for a constellation also requires reference to a manual to know the correct settings, and often a small tool and/or reading glasses to manipulate small switches. This is difficult because it requires a certain knowledge by the user and is error prone because the switches are cryptic, hard to see and manipulate, and often one cannot discern whether a given switch (e.g., a DIP switch) is in the up or down position.

Providing one or more buttons with a simple and inexpensive display (e.g., lights or text) to indicate the desired provider or constellation also requires reference to a manual to interpret the simple light elements and how to provide the necessary input to the system to change a setting or confirm that the setting is correct. Providing a larger graphical user interface may be more user friendly for making and confirming selections but is cost prohibitive.

Other means for manually telling the antenna if the correct spacecraft for a given constellation is currently being pointed at are undesirable because each requires advanced skill from the user and burdens them with paying attention to the scanning process.

Thus, there is a need to provide an easy-to-use satellite television antenna system that automates or reduces the steps that a user must go through to watch television.

SUMMARY

The present invention addresses certain deficiencies discussed above by providing for a device, method and system of a satellite television antenna that can determine automatically which of at least two different constellations of spacecraft correspond to the service provider of the user's satellite television programming.

The automatic constellation-selecting self-pointing satellite antenna system automatically determines which constellation of spacecraft to use and then scans the sky for the locations of those spacecraft. Thus, the user's need to interact with the antenna system can be greatly reduced or eliminated.

By automatically choosing the correct set of spacecraft to point at and then locating them and receiving their signals, the invention offers improved ease-of-use to the user.

The disclosure includes a satellite television antenna system. The satellite television antenna system can include a self-pointing satellite antenna and a power inserter coupled to the self-pointing satellite antenna. The power inserter can include an enclosure body and a circuit board disposed inside of the enclosure body. The circuit board includes a microprocessor. The microprocessor can be configured via software code to determine whether a first type of communication protocol is being received from a set top box (STB) coupled to the power inserter, determine a configuration for a first constellation of spacecraft if the first type of communication protocol is being received from the STB, and determine a configuration for a second constellation of spacecraft if the first type of communication protocol is not being received from the STB. The first constellation of spacecraft is different than the second constellation of spacecraft.

The disclosure also includes a power inserter for a satellite television antenna system. The power inserter can include an enclosure body and a circuit board disposed inside of the enclosure body. The circuit board can include a microprocessor. The microprocessor can be configured via software code to: determine whether a first type of communication protocol is being received from a STB coupled to the power inserter; determine a configuration for a first constellation of spacecraft if the first type of communication protocol is being received from the STB; and determine a configuration for a second constellation of spacecraft if the first type of communication protocol is not being received from the STB. The first constellation of spacecraft is different than the second constellation of spacecraft.

The microprocessor can be further configured via software code to determine whether a user has initiated a scan before determining that the configuration is for a second constellation of spacecraft.

The microprocessor also can be configured via software code to determine that the configuration is for a second constellation of spacecraft only after a first to occur of the following events: a user initiates a scan; and a set time elapses following the determination that the first type of communication protocol is not being received from the STB.

The first type of communication protocol can be a DiSEqC message.

The power inserter can include a status light coupled to the microprocessor and located so that the status light is visible externally form the power inserter. The power inserter can also include a button provided to the power inserter and coupled to the processor so that a user can initiate a scan routine by the self-pointing satellite antenna.

The power inserter can include an amplifier to amplify television signals received from the a self-pointing satellite antenna. The power inserter can also be configured to supply power to the a self-pointing satellite antenna on a single conduit that also transmits television signals from the self-pointing satellite antenna to the power inserter.

The self-pointing satellite antenna can include a motorized reflector dish, movable in at least one of an azimuth orientation and an elevation orientation, and an antenna control system that controls movement of the motorized reflector dish. The antenna control system can be configured to conduct two-way query and response communications between the self-pointing satellite antenna and the STB. The antenna control system is responsive to a query issued by the STB to the self-pointing satellite antenna.

The self-pointing satellite antenna can include an enclosure, and the motorized reflector dish and the antenna control system can be disposed inside of the enclosure.

The disclosure further includes a method of automatically determining whether to perform a search for a first constellation of spacecraft by a satellite television antenna system or a second constellation of spacecraft by the satellite television antenna system. The first constellation of spacecraft is different than the second constellation of spacecraft. The method can include connecting a power inserter to a self-pointing satellite antenna, connecting the power inserter to a STB, determine by the power inserter whether a first type of communication protocol is being received by the power inserter from the STB, determining by the power inserter that a search for the first constellation of spacecraft should be performed if the first type of communication protocol is being received by the power inserter from the STB, and determining by the power inserter that a search for the second constellation of spacecraft should be performed if the first type of communication protocol is not being received by the power inserter from the STB.

The power inserter can also determine whether a user has initiated a scan before determining that the configuration is for a second constellation of spacecraft. The power inserter can further determine that the configuration is for a second constellation of spacecraft only after a user initiates a scan.

The power inserter also can determine that the configuration is for a second constellation of spacecraft only after a set time elapses following the determination by the power inserter that the first type of communication protocol is not being received from the STB.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The various features or aspects discussed herein can also be combined in additional combinations and embodiments, whether or not explicitly discussed herein, without departing from the scope of the invention.

The satellite antenna device and system can take many forms and can be configured for standing on the ground or a surface or mounted to a structure. The satellite antenna components can be fully enclosed, partially enclosed or non-enclosed. The satellite antenna can be configured to aim at one satellite orbital slot at a time or it can be configured to aim at multiple slots simultaneously.

One example antenna apparatus can be configured as a transportable antenna system (with or without handle), such as disclosed in U.S. Pat. Nos. 8,789,116 and 7,595,764, the entirety of both are hereby incorporated by reference herein. Also, the antenna apparatus can be configured as a vehicular mobilized satellite antenna product for mounting on the roof of a vehicle such as disclosed in U.S. Pat. Nos. 6,864,846, 6,937,199 or 8,368,611, each of which are hereby incorporated by reference herein in their entirety.

The operations, structural devices, acts, systems, modules, logic and method steps discussed herein below, according to certain embodiments of the present invention, may take the form of a computer program or software code stored on a tangible or non-transitory machine-readable medium (or memory) in communication with a processor which executes the code or program to perform the described behavior, function, features and methods. It will be recognized by those skilled in the art that these operations, structural devices, acts, logic, method steps and modules may be implemented in software, in firmware, in special purpose digital logic, or any combination thereof, without deviating from the spirit and scope of the present invention as recited within the claims attached hereto.

Thus, the operation of the systems and the methods described herein can be formed as an algorithm, stored as code in memory, resident in a satellite broadcast reception antenna apparatus (or an external component thereto) and executed by a microprocessor of the antenna device or an external component connected to the antenna device.

Figure 1:
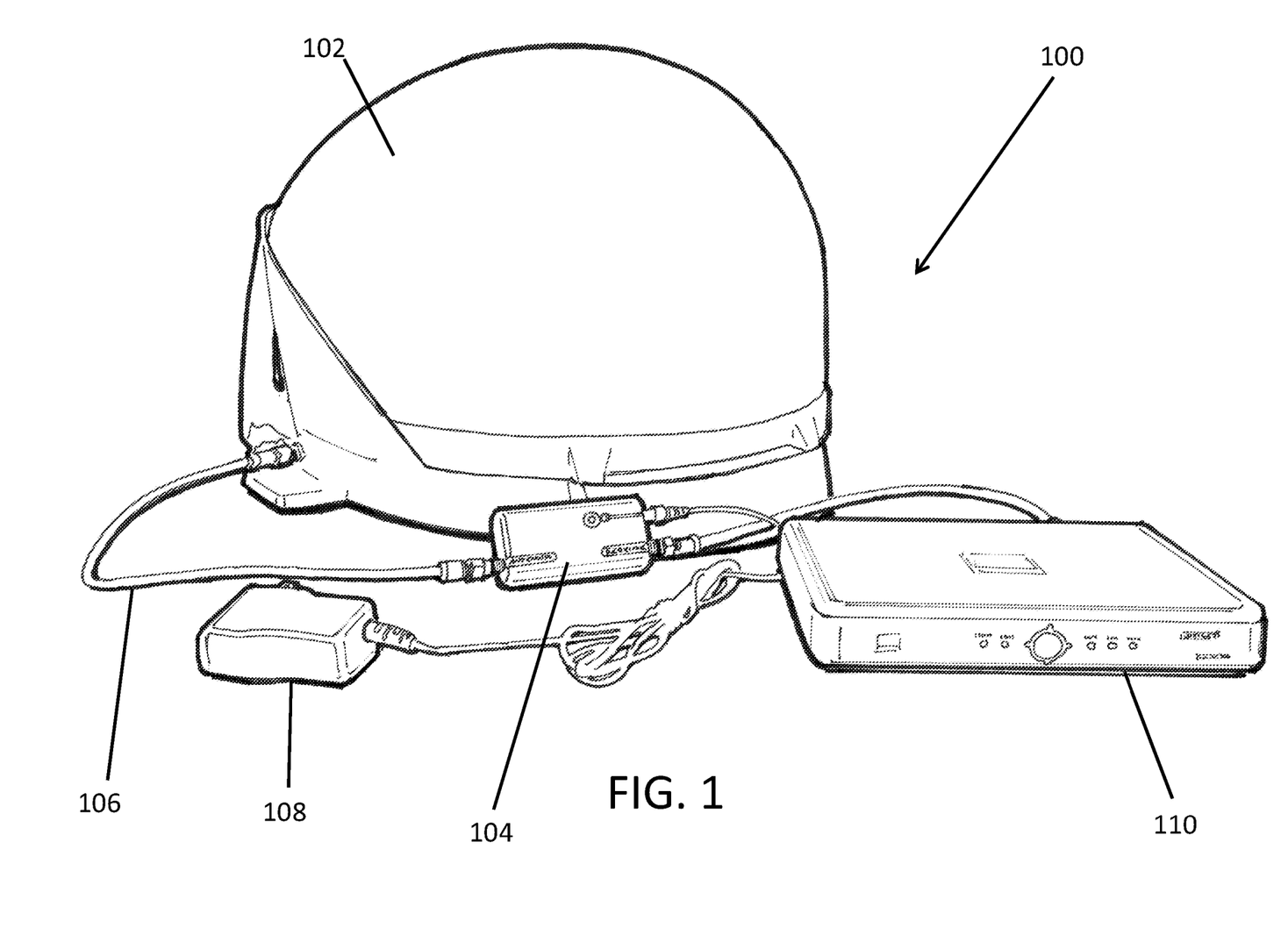
FIG. 1 is an illustration of a satellite television antenna system according to certain example embodiments.

Referring to FIG. 1, the automatic constellation-selecting self-pointing satellite antenna system 100 generally comprises a self-pointing satellite antenna 102 coupled to an externally-located power inserter 104 component. The power inserter 104 is coupled to the antenna device 102 via a coaxial cable 106 or other wired or wireless conduit. A power supply 108 is connected to the inserter 104 to supply power to the inserter 104 and the antenna 102. The power for the antenna 102 travels along the same coaxial cable 106 as the television and command signals to and/or from the STB 110. Thus, the antenna 102 does not need more than a single coaxial (or other conduit) connection.

The inserter 104 is coupled to a set top box (STB) 110. The STB 110 is coupled to the user's television set (not shown).

Figure 2:
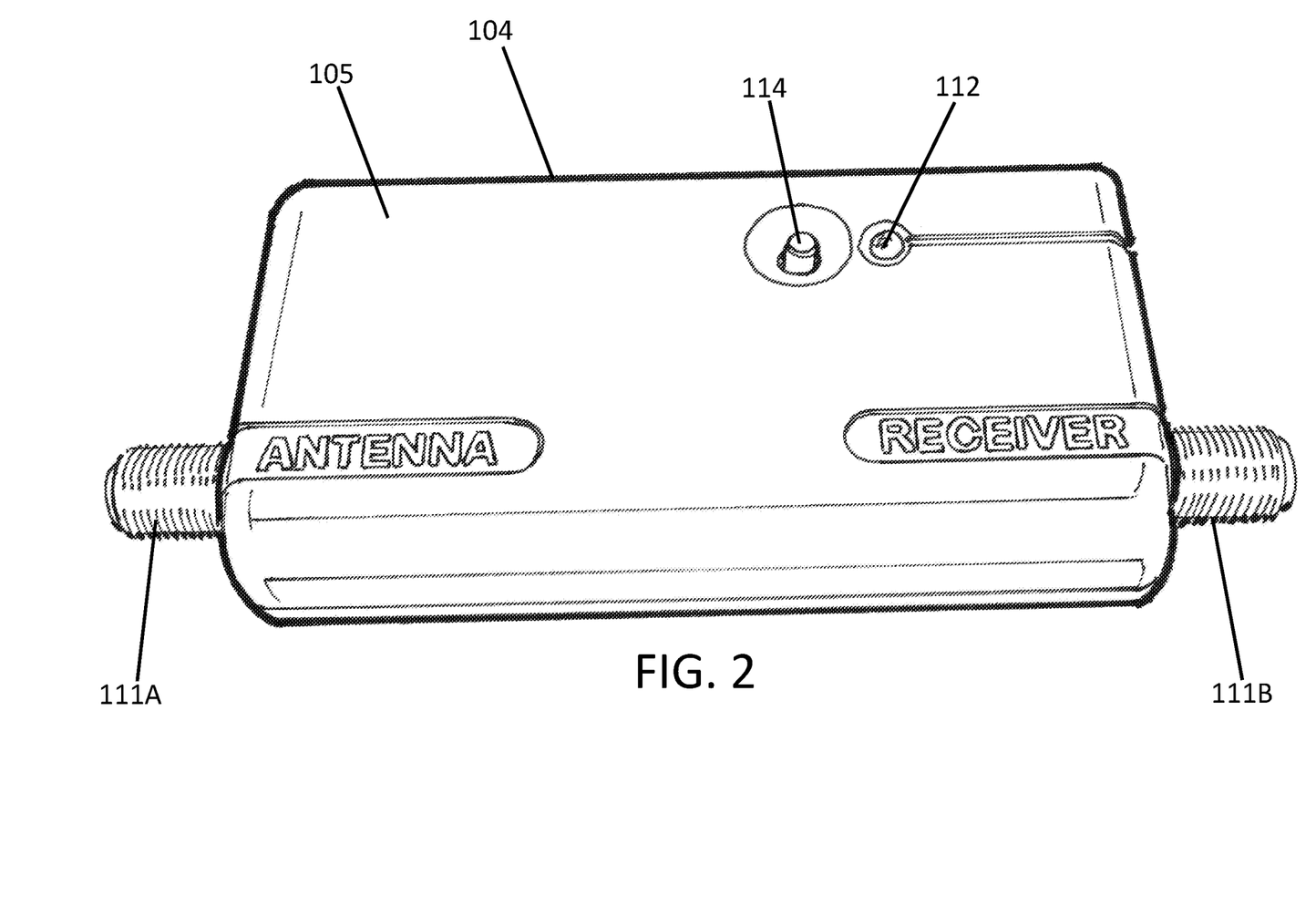
FIG. 2 is a perspective view of a power inserter component of a satellite television antenna system according to certain example embodiments.

FIG. 2 shows the power inserter 104 alone. The inserter 104 comprises an enclosure body 105 with protruding male connectors 111A, 111B for attachment of cables to the antenna device 102 and the STB 110 (receiver), respectively. A female connector is defined into the body to receive the male plug of the power supply 108. Of course, other connector types can be used without departing from the scope of the invention.

Figure 3:
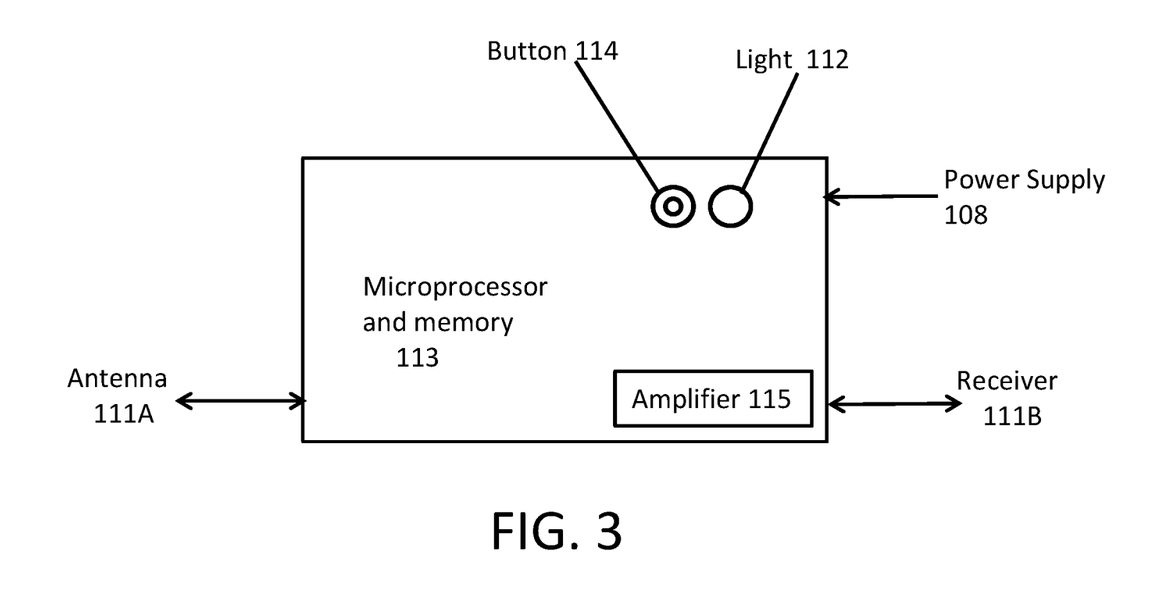
FIG. 3 is a diagram of the components of a power inserter for a satellite television antenna system according to certain example embodiments.

The inserter 104 includes a circuit board 113 that includes a processor and memory (collectively 113) disposed inside of the enclosure body 105. Software code stored in the memory is executed by the processor to control the operation of the inserter. The memory can be integrated into the processor component or can be a separate memory with which the processor communicates. The inputs from the power supply 108 and from the antenna 111A are shown along with the output to the receiver 111B.

Referring to both FIGS. 2 and 3, a status indicator light 112, such as an LED, is provided to indicate status (e.g., scanning, locked, error, etc.) to the user. The light 112 is coupled to the processor 113 and can flash and change colors to indicate various statuses or states. More than one light can also be provided. An alternate or supplemental display such as a numerical indicator can be provided.

A user input means such as an activation button or switch 114 can also be provided to the inserter 104. The button 114 is coupled to the processor 113 and can be pushed by the user to initiate a scan of the sky by the antenna, or any other designated function. More than one input means can also be provided. The inserter 104 can also allow for a completely automatic configuration and antenna scan sequence that does not utilize any user input means.

The inserter 104 functions to receive input from the STB 110 and relay commands or provide commands to the antenna device 102. The inserter also can amplify the signals received from the antenna before relaying those signals to the receiver. In such amplification embodiment, the microprocessor circuit 113 also includes an amplifier circuit 115.

The inserter's 104 components can also be housed inside of, or integrated into, the antenna's 102 enclosure instead of being housed in a separate external inserter enclosure body 105. The inserter's functionality can also be integrated into the control electronics of the antenna device. In these embodiments, the light and user input means can be disposed at the surface of the antenna's enclosure.

The antenna 102 can be powered by line voltage from the STB, a separate power input, by the power inserter 104, by a battery, by solar, or any combination thereof.

The different satellite TV service providers (Providers) (e.g., DISH, DirecTV and others) broadcast their television signals from a single or a set of multiple spacecraft that are at known locations surrounding the Earth. This single spacecraft or set of multiple spacecraft will be referred to as a "constellation." In order to receive the broadcast of a Provider 'A', it is necessary to point at a constellation or set of spacecraft 'A', while for Provider 'B', it is necessary to point at a constellation or set of spacecraft 'B'. There are also instances where a Provider operates more than one constellation of spacecraft in order to successfully broadcast to different geographic areas.

It is the state of the industry in the U.S. that the STB 110 is unique to each service provider and sends different signals (i.e. Communication Protocol 'A' vs. Communication Protocol 'B') or different amounts of signals (Communication Protocol 'A' or no communication). The antenna system, power inserter and method of the present invention recognize these differentiated behaviors to automatically select from multiple constellations of spacecraft so that the user need only hook up their STB to the antenna system and perform a particular action, or no action, for the antenna to point at the spacecraft constellation correctly corresponding to their television service provider.

Figure 4:
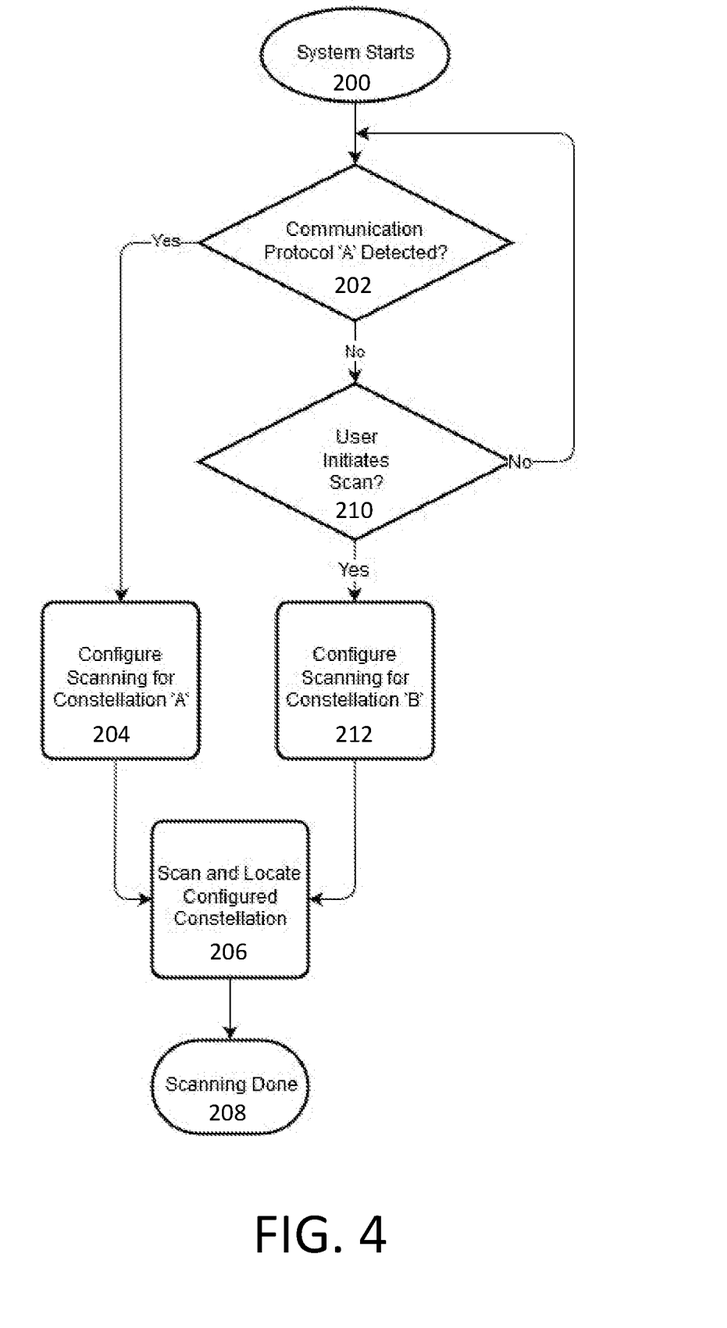
FIG. 4 is a flowchart of the operation of the antenna system according to certain example embodiments.

Referring now to FIG. 4, operation and functionality of the antenna system will be discussed. The antenna system is connected together and powered up at starting block 200. The antenna system then checks in block 202 to see if the communication protocol 'A' is present from the STB. If yes, then the antenna system is configured to scan for the spacecraft constellation 'A' 204. A scan is then performed 206 to locate the spacecraft that are members of constellation 'A'. Once located, the scanning process is complete 208 and the user is ready to watch television.

If at block 202 the communication protocol 'A' is not present from the STB, the antenna system then queries whether the user has initiated a scan 210. The user can initiate a scan, for example, by pressing the button 114 located on the power inserter 104. Query blocks 202 and 210 loop until either communication protocol 'A' is detected or the user initiates a scan.

Once the user initiates the scan 210, the antenna is configured to scan for constellation 'B' 212. A scan is then performed 206 to locate the spacecraft that are members of constellation 'B'. Once located, the scanning process is complete 208 and the user is ready to watch television.

As an alternative to the looping of blocks 202 and 210, a timer can be initiated upon the first occurrence of block 202. After a preset time lapses without the user initiating a scan or the protocol being detected, the antenna system will proceed automatically to configuration block 212 and then scan for the spacecraft in block 206. The preset time window can be 1 minute, 2 minutes, five minutes, etc.

In scan step 206, the antenna system can rotate its antenna element (e.g. reflector dish) about one or more axes to attempt to ascertain the locations of all necessary spacecraft in the set constellation. Then upon a signal from the STB, the antenna will point at the specific currently-requested spacecraft where the particular channel that the user has selected on the STB is being broadcast from orbit.

In one embodiment, the present antenna system uses the communications protocols described in U.S. Pat. No. 8,789,116, or the lack thereof, to differentiate whether to configure for constellation 'A' or 'B'. More generally, the presence of an expected protocol communication or a lack thereof may constitute the relevant difference to the antenna system for making its determination automatically.

In another embodiment, the system uses the content of a DiSEqC message (or other communications protocol) from the STB (e.g. the particular command issued, the destination address specified, etc.) to differentiate between the equipment of one service provider that uses only certain message content and another service provider that uses different content.

In another embodiment, the system uses the type of signaling method (e.g. changing the DC voltage on the antenna port of the STB according to a protocol, multiplexing a time-varying waveform (e.g. presence or absence of 22 kHz signal as in DiSEqC, or using the presence of one of two frequencies as in Frequency Shift Keying ('FSK')) on to the coaxial cable to differentiate between equipment from providers that use different signaling methods on their respective STBs.

In another embodiment, the antenna system locates multiple mutually exclusive constellations. Then, the STB will send messages that will in-turn select each of the spacecraft in each constellation. The STB knows its corresponding service Provider and which spacecraft are needed. When the STB sees an undesired spacecraft signal the STB will send the antenna system a message to ignore that spacecraft; when the STB sees a desired spacecraft the STB will send a message to the antenna system to include that spacecraft.

In another embodiment, the antenna system uses a geolocation receiver (e.g. GPS, Glonass, Galileo, eLORAN, etc.) to choose the constellation corresponding to service Providers (or between multiple constellations of the same Provider) operating in separate geographic areas.

In yet another embodiment, the antenna system positively identifies multiple spacecraft through the nature of their broadcast signals. The antenna system then uses triangulation, trilateration or other geometric techniques to determine the geographic location of the antenna, then uses that knowledge to select the appropriate constellation from multiple Providers or between multiple constellations operated by the same service Provider. Other techniques for identifying spacecraft are provided in U.S. Pat. No. 10,320,074 B2, which is incorporated herein by reference in its entirety.

Thus, any one or a combination of any of the following can be used by the antenna system to differentiate automatically between the desired providers and/or constellations:
    whether or not a communication protocol is used;
    what type of communication protocol is used;
    what content is in a given communication protocol;
    for communication protocols that can ask for "Satellite 1 or 2" with one style of messages or "Satellite A or B or C" with another, the system will find [1, 2, A, B, C] and leave it to the STB to determine which constellation to use; and
    Geolocation to determine if the user is in one geographic area (e.g. USA) vs. another (e.g. Canada) and is therefore likely to be using the STB of the provider designated to operate in that geographic area.

The present antenna system can automatically differentiate between more than 'A' and 'B' constellations. For example, the system can be configured to differentiate automatically between constellations 'A', 'B', 'C', etc.

It is understood that the functions and logic to differentiate between constellations is programmed as software code into the power inserter 104 component. The power inserter is in two-way communication with both the antenna unit and the STB.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:
1. A satellite television antenna system, comprising:
a self-pointing satellite antenna; and a power inserter, located remote from the self-pointing satellite antenna, that can be coupled to the self-pointing satellite antenna, the power inserter comprising:
an enclosure body;
a first connector to connect the power inserter to a set top box (STB) via a first coaxial cable;
a second connector to connect the power inserter to the self-pointing satellite antenna via a second coaxial cable; and
a circuit board disposed inside of the enclosure body, the circuit board including a microprocessor,
wherein the microprocessor is configured via software code to:
determine whether a first type of communication protocol is being received from the STB coupled to the power inserter via the first coaxial cable;
determining a configuration for a first constellation of spacecraft if the first type of communication protocol is being received from the STB; and
determining a configuration for a second constellation of spacecraft if the first type of communication protocol is not being received from the STB,
wherein the first constellation of spacecraft is different than the second constellation of spacecraft.

2. The satellite television antenna system of claim 1, wherein the microprocessor is further configured via software code to determine whether a user has initiated a scan before determining that the configuration is for a second constellation of spacecraft.

3. The satellite television antenna system of claim 1, wherein the microprocessor is further configured via software code to determine that the configuration is for a second constellation of spacecraft only after a first to occur of the following events:
a user initiates a scan; and
a set time elapses following the determination that the first type of communication protocol is not being received from the STB.

4. The satellite television antenna system of claim 1, wherein the first type of communication protocol is a DiSEqC message.

5. The satellite television antenna system of claim 1, wherein the power inserter further comprises a status light coupled to the microprocessor and located so that the status light is visible externally from the power inserter.

6. The satellite television antenna system of claim 1, wherein the power inserter further comprises a button provided to the power inserter and coupled to the processor so that a user can initiate a scan routine by the self-pointing satellite antenna.

7. The satellite television antenna system of claim 1, wherein the power inserter further comprises an amplifier to amplify television signals received from the self-pointing satellite antenna.

8. The satellite television antenna system of claim 1, wherein the power inserter is configured to supply power to the self-pointing satellite antenna solely via the second coaxial cable that also transmits television signals from the self-pointing satellite antenna to the power inserter.

9. The satellite television antenna system of claim 1, wherein the self-pointing satellite antenna comprises:
a motorized reflector dish, movable in at least one of an azimuth orientation and an elevation orientation; and
an antenna control system that controls movement of the motorized reflector dish, the antenna control system configured to conduct two-way query and response communications between the self-pointing satellite antenna and the STB,
wherein the antenna control system is responsive to a query issued by the STB to the self-pointing satellite antenna.

10. The satellite television antenna system of claim 9, wherein the self-pointing satellite antenna further comprises an enclosure, and wherein the motorized reflector dish and the antenna control system are disposed inside of the enclosure.

11. A power inserter for a satellite television antenna system, wherein the power inserter is located remote from a self-pointing satellite antenna, the power inserter comprising:
an enclosure body;
a first connector to connect the power inserter to a set top box (STB) via a first coaxial cable;
a second connector to connect the power inserter to the self-pointing satellite antenna via a second coaxial cable; and
a circuit board disposed inside of the enclosure body, the circuit board including a microprocessor,
wherein the microprocessor is configured via software code to:
determine whether a first type of communication protocol is being received from the STB coupled to the power inserter via the first coaxial cable;
determining a configuration for a first constellation of spacecraft if the first type of communication protocol is being received from the STB; and
determining a configuration for a second constellation of spacecraft if the first type of communication protocol is not being received from the STB,
wherein the first constellation of spacecraft is different than the second constellation of spacecraft.

12. The satellite television antenna system of claim 11, wherein the microprocessor is further configured via software code to determine whether a user has initiated a scan before determining that the configuration is for a second constellation of spacecraft.

13. The satellite television antenna system of claim 11, wherein the microprocessor is further configured via software code to determine that the configuration is for a second constellation of spacecraft only after a first to occur of the following events:
a user initiates a scan; and
a set time elapses following the determination that the first type of communication protocol is not being received from the STB.

14. The satellite television antenna system of claim 11, wherein the power inserter further comprises a status light coupled to the microprocessor and located so that the status light is visible externally from the power inserter.

15. The satellite television antenna system of claim 11, wherein the power inserter further comprises a button provided to the power inserter and coupled to the processor so that a user can initiate a scan routine by the self-pointing satellite antenna.

16. The satellite television antenna system of claim 11, wherein the power inserter is configured to supply power to the self-pointing satellite antenna solely via the second coaxial cable that also transmits television signals from the self-pointing satellite antenna to the power inserter.

17. A method of automatically determining whether to perform a search for a first constellation of spacecraft by a satellite television antenna system or a second constellation of spacecraft by the satellite television antenna system, wherein the first constellation of spacecraft is different than the second constellation of spacecraft, the method comprising:
- connecting a power inserter to a self-pointing satellite antenna via a first coaxial cable, wherein the power inserter is located remote from the self-pointing satellite antenna;
- connecting the power inserter to a set top box (STB) via a second coaxial cable;
- determining by the power inserter whether a first type of communication protocol is being received by the power inserter from the STB via the second coaxial cable;
- determining by the power inserter that a search for the first constellation of spacecraft should be performed if the first type of communication protocol is being received by the power inserter from the STB; and
- determining by the power inserter that a search for the second constellation of spacecraft should be performed if the first type of communication protocol is not being received by the power inserter from the STB.

18. The method of claim 17, further comprising determining by the power inserter whether a user has initiated a scan before determining that the configuration is for a second constellation of spacecraft.

19. The method of claim 17, further comprising determining by the power inserter that the configuration is for a second constellation of spacecraft only after a user initiates a scan.

20. The method of claim 17, further comprising determining by the power inserter that the configuration is for a second constellation of spacecraft only after a set time elapses following the determination by the power inserter that the first type of communication protocol is not being received from the STB.

* * * * *